United States Patent [19]
Kableshkov

[11] Patent Number: 5,490,100
[45] Date of Patent: Feb. 6, 1996

[54] CUMULATIVE SUMMATION UNIT

[75] Inventor: Stoian Kableshkov, Ayr, Scotland

[73] Assignee: Digital Equipment Corporation, Maynard, Mass.

[21] Appl. No.: 177,056

[22] Filed: Jan. 4, 1994

[30] Foreign Application Priority Data

Jan. 9, 1993 [GB] United Kingdom ............... 9300328

[51] Int. Cl.$^6$ .................................................. G06F 7/38
[52] U.S. Cl. ............................................ 364/736; 364/748
[58] Field of Search .................................... 364/748, 736

[56] References Cited

U.S. PATENT DOCUMENTS

| | | | |
|---|---|---|---|
| 4,760,544 | 7/1988 | Lamb ........................................ | 364/736 |
| 4,773,006 | 9/1988 | Kinoshita et al. ....................... | 364/736 |
| 4,872,131 | 10/1989 | Kubota et al. ......................... | 364/736 |
| 4,958,312 | 9/1990 | Ang et al. ............................... | 364/736 |
| 5,175,702 | 12/1992 | Beraud et al. .......................... | 364/736 |
| 5,241,492 | 8/1993 | Girardeau, Jr. ......................... | 364/736 |

*Primary Examiner*—Tan V. Mai
*Attorney, Agent, or Firm*—Arthur W. Fisher; Ronald C. Hudgens

[57] ABSTRACT

A summation unit device suitable for the cumulative summation of integer and/or floating point format data presented to an input thereof. The device is particularly useful as an adjunct to a relational database co-processor, receiving data therefrom relating to a plurality of different columns of a database table for the independent summation of the different columns. The data is received on a byte-by-byte basis, and summation takes place in "quasi-realtime" on each byte as it is presented at the device input. A number of running totals are generated which may be output at the end of the database query. The device uses a register for storing a plurality of running totals, a byte-adder for summing each new data-byte with a respective byte from the running totals register, and byte- and bit-shifting operations to correctly align floating point mantissa during summation in accordance with an exponent difference value determined from the respective running total and new floating point format data. The pipelined architecture of the device allows for selection of respective bytes from two numeric additives according to the exponent difference value and delay-less bit shifting of one such byte in accordance with the exponent difference value to provide two operands. Successive bytes are provided to be summed, with latching to wrap-around residual bits from preceding bytes.

7 Claims, 3 Drawing Sheets

CUMULATIVE SUMMATION UNIT

FIELD OF THE INVENTION

The present invention relates to an autonomous, quasi-realtime device for the cumulative summation of integer and/or floating point format data presented at an input thereof. In particular, the device, hereinafter referred to as "summation unit" has particular application to the column-wise summation of several integer and/or floating point format attributes of a relational database table, and would receive qualified additives from, for example, a relational database co-processor or relational database accelerator (RDBA) such as that described in co-pending U.S. application Ser. No. 08/177,362 entitled "Database Co-processor" in the name of the present applicant.

The above document is incorporated herein by reference, and describes a co-processor for receiving data, row-by-row from a relational database table, and selecting, according to predetermined criteria, table elements or fields of a particular row where that row qualifies for selection. Commonly, these fields are required for cumulative summation on a row-by-row basis, to sum all qualified fields in a particular column. Additionally, the independent summation of several different columns within the same scanning of the table is highly desirable.

Qualified column-wise summation of table elements is a frequent relational database processor function. It is the basis for deriving totals, averages and percentages so typical of many relational database applications.

Normally, this function is performed by a CPU while searching through the relational database tables, and is thus subject to all of the performance and memory-related drawbacks of prior art relational database processors. Specific search-dedicated hardware, such as the relational database co-processor described above, which is directed to the identification of qualified rows of a table would be handicapped if unable to perform summation functions as well as the searching and qualification functions. Without some form of summation unit, the RDBA would merely be capable of returning to a host CPU, columns of values, or pointers to those values in memory, for the host processor to subsequently calculate column totals and averages.

Such a summation would then typically be carried out by the CPU using known addition techniques on each successive floating point and/or integer format additives. For example, 8-byte floating point values are successively loaded into appropriate registers for addition according to known techniques. Where the additives are provided on an 8-bit bus, such as that described in the cross-referenced document, this requires that the entire 8-byte additive is buffered in an appropriate memory location prior to the summation process commencing.

SUMMARY OF THE INVENTION

It is an object of the present invention to provide an RDBA with a summation unit capable of fulfilling the column-wise summation of qualified additives produced by the RDBA in quasi-realtime.

It is a further object of the present invention to provide a summation unit capable of performing a cumulative summation on integers and/or floating point format values on a byte-by-byte basis as the values are transmitted on an appropriate communication link.

According to one embodiment of the present invention there is provided a summation unit for the cumulative summation of a series of numeric additives, each additive comprising a plurality of bit-sequences or bytes, the summation unit comprising storage means for storing at least one cumulative summation running total of the series of numeric additives, receiving means for receiving a first selected bit-sequence of one of the series of numeric additives to form a first operand, selection means for selecting from the cumulative summation running total a second bit-sequence corresponding to the first selected bit-sequence to form a second operand, addition means for adding the first and second operands to provide a result, and write means for updating the storage means with a third bit-sequence corresponding to the result.

BRIEF DESCRIPTION OF THE DRAWING

Embodiments of the present invention will now be described by way of example, and with reference to the accompanying drawings in which.

DESCRIPTION OF PREFERRED EMBODIMENTS

Figure 1:
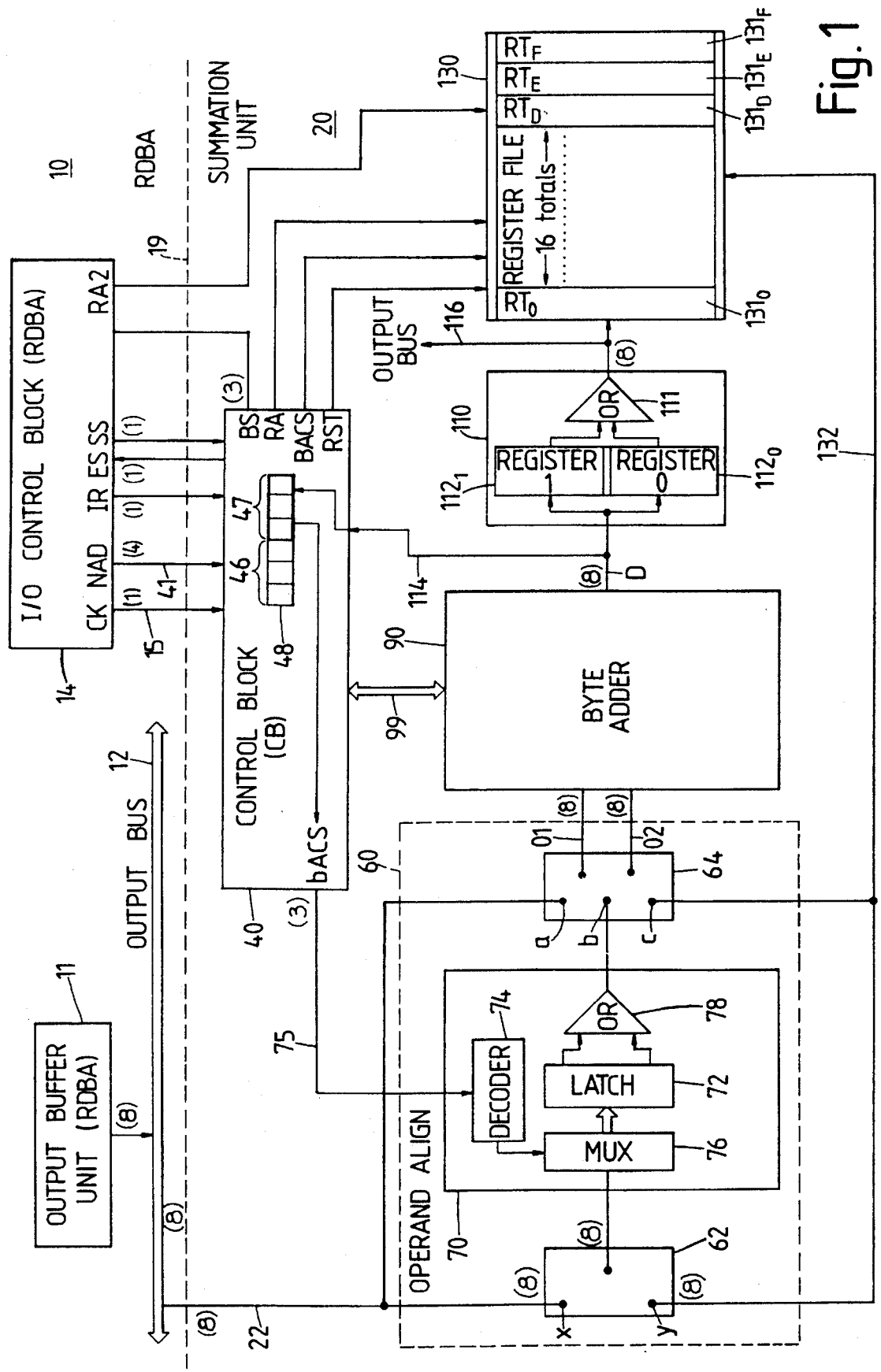
FIG. 1 shows a schematic diagram of a cumulative summation unit according to the present invention, and its interface with a relational database co-processor.

Referring now to FIG. 1, there is shown a block diagram giving an overview of a summation unit 20 in accordance with the present invention. The summation unit 20 is intended to operate as an integral part of, or adjunct to, an RDBA 10 as defined herein. Throughout the accompanying drawings, a figure in brackets adjacent to connections between various functional blocks indicates the number of lines.

The summation unit 20 is preferably designed to be integrated with the RDBA 10 on the same ASIC, and in such an embodiment may comprise approximately 15% of the overall ASIC gate count. The summation unit thus enhances the statistical capabilities of the RDBA, and further contributes to the reduction of relational database query response time. The embodiments described herein will enable the RDBA, for example, to provide qualified column averages by performing qualification, counting and summation of totals in one pass through a database table, with only pairs of data items for each column returned to the host CPU—ie. column total and column size (number of additives)).

The RDBA 10 (the relevant features of which are shown above dotted line 19 in FIG. 1) places qualified row attributes (ie. column entries) from an output buffer 11 onto an output bus 12 in a byte-wide data-stream. An input/output control block 14 performs various control functions in respect of the RDBA which have been described in the cross-referenced document. The i/o control block 14 also performs various interface and control functions between the RDBA 10 and a control block 40 in the summation unit 20 as will be later described.

The summation unit 20 (the main features of which are shown below the dotted line 19 in FIG. 1) operates in a pipelined fashion on the one-byte wide data-streams which the RDBA places on the output bus 12.

The data comprises a stream of qualified fields to be added, hereinafter referred to as "new additives", provided by the output buffer 11. The individual field values, or additives are provided in a predetermined sequence of additives corresponding to the column sequence, and each additive is provided in a variable, predefined order of bytes.

For example, where three columns $C_1$, $C_2$, and $C_3$ of the relational database table are being summed, the entries of each qualified row R will be provided row by row in sequence $R_1C_1$, $R_1C_2$, $R_1C_3$, $R_2C_1$, $R_2C_2$ etc. RDBA 10 provides a type and size description (NAD) of each new additive placed on the output bus 12 from a result definition array (not shown) in the i/o control block 14.

The stream of new additives is added, in quasi-realtime, to running totals according to the sequence above, in which the new additives are placed on the bus 12. Each additive will be represented by, for example, eight consecutive bytes in a predetermined sequence. Running totals for each column C are accumulated in a register file 130. Final results (eg. column totals) are sent under summation unit 20 and RDBA 10 control from the register file 130, together with column sizes from the RDBA output buffer unit 11, to the host processor (not shown) over output bus 12 as part of an extended query termination procedure.

The new additives are provided to the summation unit 20 on line 22 to an operand align unit 60 which is a set of distributed circuits, shown in the FIGS. as a separate entity for convenience only. It is used to provide for near-delayless shift of aligned operands as will be described. This enables, for example, mantissa addition of floating point format additives to commence as soon as exponent differences have been determined. The operand align unit includes two switches 62,64—an input switch (62) and an operand switch (64) —and a virtual bit shifter 70. The input switch 62 provides a single input to virtual bit shifter 70 from one of two inputs x or y, corresponding to new additive on line 22, or running total from register file 130 on line 132, respectively. The operand switch 64 provides two operands O1 and O2 to a byte adder circuit 90, the operands being selected from three possible inputs a, b and c. Inputs a, b and c correspond to: (a) the unshifted new additive on line 22; (b) the shifted new additive (from x); or the shifted running total (from y); and (c) the unshifted running total on line 132.

The operand align unit thus provides two operands O1 and O2 to byte adder 90. One operand will be the new additive provided on line 22; the other operand will be a running total provided from register file 130. Byte adder 90 passes byte sums to result register 110 in the form of data bits on line D. Result register 110 acts as a dual byte buffer before results are passed into register file 130, or to control block 40.

The register file 130 consists of sixteen 8-byte registers $131_0$, $131_1$ ... $131_E$, $131_F$, each of which stores an integer or floating point format running total of up to eight bytes each. Thus, in the embodiment shown, the register file can accommodate the cumulative summation of up to sixteen columns.

The summation unit 20 uses the same clock CK as the RDBA provided on line 15 from the i/o control block 14. In a preferred embodiment, this clock runs at up to 33 MHz, or ~30 ns cycle time. The one-byte wide output bus would thus run at 33 MB/s. The summation unit is able to match the burst mode on this bus.

Control block 40 defines the timing, and controls the overall activity of the summation unit 20. It includes:

a) state machine logic to define states, modes and phases of operation of the summation unit, as well as their duration, dependent upon the nature of the operands;

b) new additive description analysis logic which receives 4-bit new additive descriptions (NAD) on lines 41 which informs the state machine and byte adder 90 about the type and size of new additives. NAD typically comprises four bits, bit #1 representing IEEE or VAX format; bit #2 representing integer or floating point format; bits #3,#4 representing type—eg. floating point F-, S-, D-, G- or T-format, or integer word, longword or quadword format;

c) exponent difference logic to determine floating point mantissa alignment prior to addition. This includes a six-bit latch 48 which conditions the virtual bit shifter 70, and operand byte address generation;

d) byte-address generation logic which defines result register 110 and register file 130 addresses, and controls the input switch 62 and operand switch 64.

There are two main states associated with the summation unit 20: idle and operational. The summation unit idles when the RDBA 10 idles, or when the query being processed by RDBA needs no summations. When operational, summation unit alternates between working and pausing. While working, it operates in one of three modes: initialization, summation and output.

Initialization mode

This is performed during the activation mode of the RDBA 10, when query parameters are downloaded to the RDBA—for example identifying candidate output fields' type and size. Where the activator program specifies that column sums are required, the summation unit will be initialized by asserting a signal on the initialize registers line (IR). This causes the summation unit to switch to operational state, and resets all registers $131_n$ in register file 130.

Summation mode

This is the main working mode, occurring while the RDBA 10 is operating on an input data stream to provide qualified output results from the downloaded query. Summation mode is triggered by a start summation line (SS) denoting that a numeric summation field is present for output from the output buffer 11. For each new additive provided by the output buffer 11, a register address line RA2 is used to provide an address within register file 130 to identify the appropriate running total to the new additive presently being output from output buffer 11. For each new additive, a three-bit byte select line BS is used by the control block 40 to trigger the output of each byte of the new additive, from output buffer 11, in predetermined sequence. This sequence will be determined by the format of the new additives.

For example, in an IEEE long format, the floating point format new additive will be represented by a sign bit, and eleven exponent bits, followed by fifty-two mantissa bits. In the Digital VAX long format, the floating point format new additive may be represented by forty mantissa bits, one sign bit, eleven exponent bits and a further twelve mantissa bits. The control block 40 will determine the format by reading the new additive description lines NAD, and ensure that the bytes of the new additive are provided by the output buffer in the following sequence: sign bit, exponent bits, and then the mantissa bits in least significant to most significant byte order. Shorter format numbers—eg. VAX F-format or IEEE S-format—may be handled in an analogous manner using only a portion of the corresponding register $131_n$. Integers are handled in similar fashion to the mantissa portion of the floating point format.

Summation—Phase one

The first phase of the summation mode is to determine the exponent difference between the two operands—ie. the new additive and the running total. This clearly only affects floating point format operands, and is not required when dealing with integer formats. Byte select BS selects the appropriate corresponding bytes from both output buffer 11 and running total register $131_n$ in manner previously described. In IEEE So and T-formats this will be bytes #6 and #7 of the eight-byte format; in VAX F-format this will be bytes #4 and #5; and in VAX D- and G- formats this will be bytes #0 and #1. The new additive exponent is passed to byte adder 90 through operand switch 64 by selecting O1=a, and running total $RT_n$ is passed to byte adder 90 by selecting O2=c. Byte adder 90 performs the subtraction operation performing a two's complement conversion on the running total $RT_n$ exponent, and passes the result to control block 40 using line 114, where the exponent difference is stored in an exponent difference register 48 which comprises a three-bit "byte shift" portion and a three bit "bit-shift" portion. Thus for exponents which have a difference of greater than seven bits, the shifting operation which is to be carded out on the mantissa may be performed by a combination of byte and bit shifting, or byte shifting alone where the difference is a multiple of $2^3$. Where an exponent difference is found to be greater than seven bytes, the new additive may be regarded as incompatible with the running totals and an error condition indicated, or additional capability designed into the summation unit.

Summation—Phase two

In the second phase of the summation mode, the mantissa portions of the running total $RT_n$ from the register file 130 and new additive from output buffer 11 are fetched, byte-by-byte in least significant byte→most significant byte order and added by the byte adder 90. The new additive is converted into two's complement form by byte adder 90, and the running total $RT_n$ is maintained in two's complement form in the register file 130. The two operands O1 and O2 are provided to the byte adder 90 in similar fashion to the exponent bytes, but relative alignment of the smaller operand takes place according to the exponent difference, by virtual bit shifter 70, to be described in greater detail later.

For integer operands, the second phase (no first phase is required as there is no exponent portion) is performed in eight iterations (corresponding to eight bytes) and therefore in nine clock cycles, since the write-back of the final byte result to the register file 130 takes a further clock cycle. Shorter integer-format new additives may have each of their four or six most significant bytes packed with leading 00's or FF's depending upon the sign bit.

For floating point operands, the second phase (addition of mantissae) is performed in three or seven iterations. Depending upon the exponent difference magnitude and sign, either the running total $RT_n$ mantissa or the new additive mantissa is denormalized to be correctly aligned. This is performed by the byte-select signal BS, byte-align control signal BACS, and virtual bit shifter controlled by bit-align control signal bACS, according to the contents of the exponent difference register 48.

For the larger exponent operand, byte-select BS requests bytes in the following sequence: for IEEE S-format, #4,#5, #6; for IEEE T-format, #0→#6; for VAX F-format, #6,#7,#4; and for VAX D- and G-formats, #6,#7,#4,#5,#2,#3,#0. The second phase is thus carried out in four or eight clock cycles (since the write-back of the final byte result to the register file 130 takes a further clock cycle). Alignment by bit shifter 70 introduces a further clock delay, described hereinafter.

Summation—Phase three

In the third phase of the summation mode, the exponent is updated. This phase only concerns floating point format numbers where the new running total $RT_n$ exponent is different from the previous running total exponent. This occurs when:

(a) new additive exponent>running total exponent; and/or (b) the mantissae addition has resulted in a mantissa whose absolute value is outside the normalization limits for the particular floating point format in use (ie. $0.5 \leq$ |mantissa|$<1.0$ for VAX format, or $1.0 \leq$ |mantissa|$<2.0$ for IEEE format;— providing that the exponent is non-zero).

Further illustration will be provided only in respect of the VAX format: IEEE formats may be inferred. There are five possibilities for the new total exponent falling into one of three groups:

(1) NTE=NAE if $0.5 \leq$ |mantissa|$<1.0$;

(2) NTE=(NAE+1) or (RTE+1) if |mantissa| $\geq 1.0$;

(3) NTE=(NAE−1) or (RTE+1) if |mantissa|$<0.5$;

where NTE=new total exponent; NAE=new additive exponent; and RTE =running total exponent.

Where case (1) applies, the running total exponent may be updated by reading (from output buffer 11) the corresponding new additive exponent bytes once again, and writing them to register file 130. No normalization operation is required.

Case (2) requires mantissa normalization—ie. shifting to the fight by one bit (increasing exponent size). Case (3) requires mantissa normalization—ie. shifting to the left by one bit (decreasing exponent). In an optimized design, for case (3) mantissa normalization could be carried out prior to exponent update.

The third summation phase is carded out in three clock cycles: one to read the new total exponent NTE, or the running total exponent RTE again from the corresponding bytes as in phase one, one clock cycle to increment or decrement the exponent by one in the byte adder if normalization is necessary, and one cycle to write back the result to the register file 130. Registration of floating point underflow or overflow, if any, also takes place in this phase.

It will be observed that under most normal circumstances, the process of exponent update is carded out less and less frequently during a column summation as the running total becomes increasingly larger and more dominant over the new additives, thereby rendering the process faster. The exception to this rule will, of course, be observed where the column sum tends to zero, oscillating either side with positive and negative numbers.

Summation—Phase four

The fourth phase of the summation mode provides mantissa normalization. This is caused by the carry bit from the most significant (hidden) mantissa bit. In case (2) identified above (mantissa right-shift normalization), this is performed in most significant→least significant byte order, ie. the reverse of the mantissae addition of phase two. The mantissa is read from the register file 130 byte-by-byte to be shifted to the fight by one bit, and then stored back into the register file. For case (3) identified above (mantissa left-shift normalization), this phase is performed in least significant→ most significant byte order. Thus it could be made to precede the exponent update of phase three.

On its own, phase four of the summation mode is carded out in four or eight clock cycles for a three or seven byte mantissa respectively. In case (3) identified above, if exponent update were to follow normalization, the operations would be performed in only one extra clock cycle in order to handle the most significant (exponent) byte.

In case (2), the least significant bit of each successive byte is wrapped around as the most significant bit of the next byte, the vary last (least significant) bit being lost. In case (3), the reverse applies—the most significant bit of each successive byte is wrapped around as the least significant bit of the next byte, the vary last (most significant) bit being lost. Shifting is delayless, is performed via multiplexing of adjacent running total lines, and takes care of the wrap around of the last bit of each byte. For the byte where the exponent and the mantissa meet—ie. #0 or #4 for VAX formats, or #6 of IEEE formats—only the mantissa's most significant bits are shifted.

Operand alignment

The function of the operand align unit 60 will now be described in greater detail. In both the register file 130 and in the output buffer 11 integers are stored right-justified. Additionally, floating point format running totals have the same format and similar placement as their new additives, and thus both integers and exponents of floating point format numbers are a priori aligned. Thus in those two particular cases, the virtual bit shifter 70 may be bypassed. This is achieved by the operand align unit 60 under the control of control block 40 by appropriate selection operand switch 64 to position O1=a to receive the new additive, and O2=c to receive the running total.

Mantissa alignment, controlled by the result of the exponent difference calculation stored in exponent difference register 48 denotes, by its sign, which mantissa to denormalize, and by its magnitude, how many positions. As indicated, in the presently preferred embodiment, if the exponent difference transcends six bits, then the smaller exponent operand is ignored. Otherwise, the three most significant bits 46 in exponent difference register 48 denote byte shifts, and are translated into output buffer 11 and register file 130 byte address changes by asserting appropriate signals on the byte select lines BS (for output buffer 11 byte shifts) or on byte align control signal lines BACS (for register file 130 byte shifts). The three least significant bits 47 in exponent difference register 48 denote bit shifts and provide bit align control signals bACS to virtual bit shifter VbS 70. If the three least significant bits 47 of exponent difference register 48 are 000, then alignment may occur by byte shift only, and virtual bit shifter 70 may be bypassed in similar manner to that previously described with respect to exponent and integer addition. Thus, where exponent difference bits 47=000, operand switch 64 is set to O1=a and O2=c. Where exponent difference bits 47 are not 000, then one of the two following cases applies:

(1) NAE<RTE: input switch 62 set to input-x; operand switch 64 set to O1=b; O2=c;

(2) NAE>RTE: input switch 62 set to input y; operand switch 64 set to O1=a; O2=b;

where NAE=new additive exponent; and RTE=running total exponent.

Thus it can be observed that the larger exponent operand will be fed directly to the byte adder, and the smaller exponent operand will be bit shifted by VbS 70. The larger exponent operand's mantissa is accessed least significant byte →most significant byte from its beginning, and the smaller exponent operand's mantissa is accessed least significant byte→most significant byte from a displaced position corresponding to the contents of the exponent difference register. The byte adder 90 adds the new additive and the running total bytes and stores the result in register file 130 byte positions corresponding to the larger exponent operand's byte and bit addresses. Exponent update has already been discussed.

The switch positions and starting byte addresses may be conveniently represented in tabular form as below.

| | ED-MSb's | ED-LSb's | NA | RT | BS start | BACS start |
|---|---|---|---|---|---|---|
| NA < RT (−ED) | 000 | < >000 | →x | →c | MSb | 0 |
| | < >000 | 000 | →a | →c | MSb | 0 |
| | < >000 | < >000 | →x | →c | MSb | 0 |
| NA > RT (+ED) | 000 | < >000 | →a | →y | 0 | MSb |
| | < >000 | 000 | →a | →c | 0 | MSb |
| | < >000 | < >000 | →a | →y | 0 | MSb |
| NA = RT | 000 | 000 | →a | →c | 0 | 0 |

Key: NA=new additive (from output buffer 11) RT=running total (from register file (RF) 130) ED=exponent difference (in register 48): MSb in 46; LSb in 47 MSb=most significant bit LSb=least significant bit BS=byte select (starting byte address of NA shown) BACS=byte align control signal (starting byte address of RF shown)

Byte adder and result register

Figure 2:
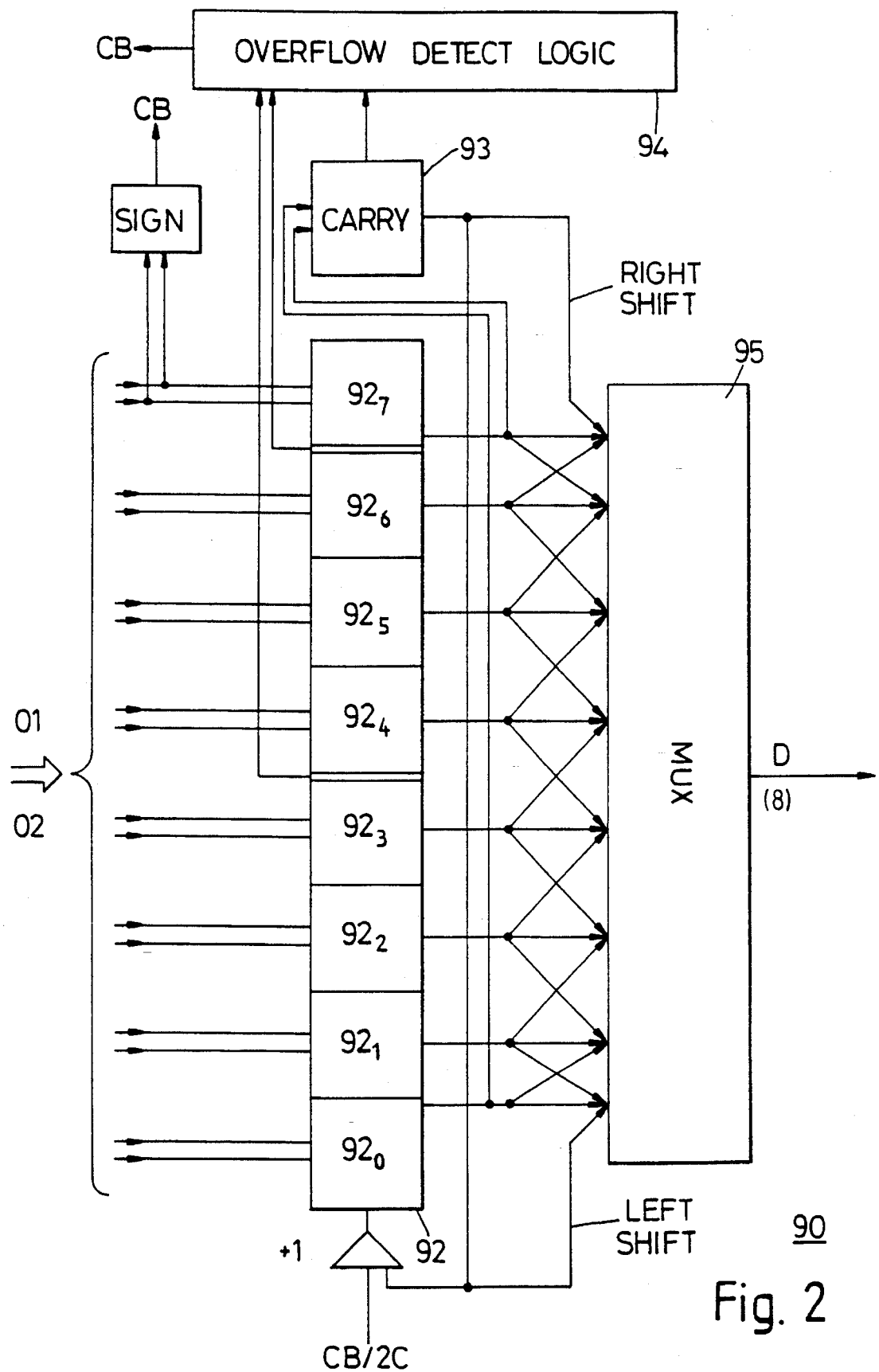
FIG. 2 shows a detailed block diagram of the byte adder according to FIG. 1.

With reference to FIG. 2 there is shown a detailed block diagram of byte adder 90.

Byte adder 90 is an 8-bit parallel full adder for integers, exponents and mantissae. It adds two operands O1, O2 in two's complement form, byte-by-byte, starting with the least significant byte, each byte addition occurring during a single clock cycle. Up to eight data bytes are produced in flip-flops $92_0$ to $92_7$, and an inter-byte carry bit stored in flip-flop 93 to be applied to the next byte summation.

Optional "fire-walls" between bit positions $92_6/92_7$, and $92_3/92_4$ correspond to operand break points for various formats. For example, in VAX G-format, the first exponent byte will commence at bit position $92_6$ (the first bit position being the sign bit), and the second exponent byte will end at $92_4$. Similarly, the final mantissa byte will require only positions $92_0$ to $92_3$. These fire-walls are controlled by the new additive description NAD from control block 40 (over control lines 99) according to the byte select and control block phases.

Byte adder 90 further includes overflow detect logic unit 94 which handles hidden most significant mantissa bits, and underflow/overflow conditions leading to normalization and denormalization. A multiplexer circuit 95 performs "delayless" one-bit left and right shifts when normalizing and denormalizing mantissae. Only part of the mantissa byte to the lower side of any "fire-wall" is shifted. The carry flip-flop 93 is used to store and wrap-around the least significant, or most significant bit.

The result register 110 (FIG. 1) is a dual latch of two 8-bit registers $112_0$ and $112_1$. Each register 112 is associated with odd or even bytes in the running totals $RT_n$. Both registers work in push-pull mode: while the byte adder 90 adds a byte from one part of the register file 130 asserted on line 132, and writes the result into, for example register $112_0$, the result from the previous byte addition is transferred from register $112_1$ to the corresponding portion of register file 130. Thus, for example, register $112_0$ would handle bytes 0,2,4 and 6 of an eight byte running total $RT_n$, and register $112_1$ would handle bytes 1,3,5 and 7 of the eight byte running total. The complementary read enable and write enable control signals for registers $112_0$ and $112_1$ corresponding to odd and even bytes are provided by control block 40.

Virtual bit-shifter

Figure 3:
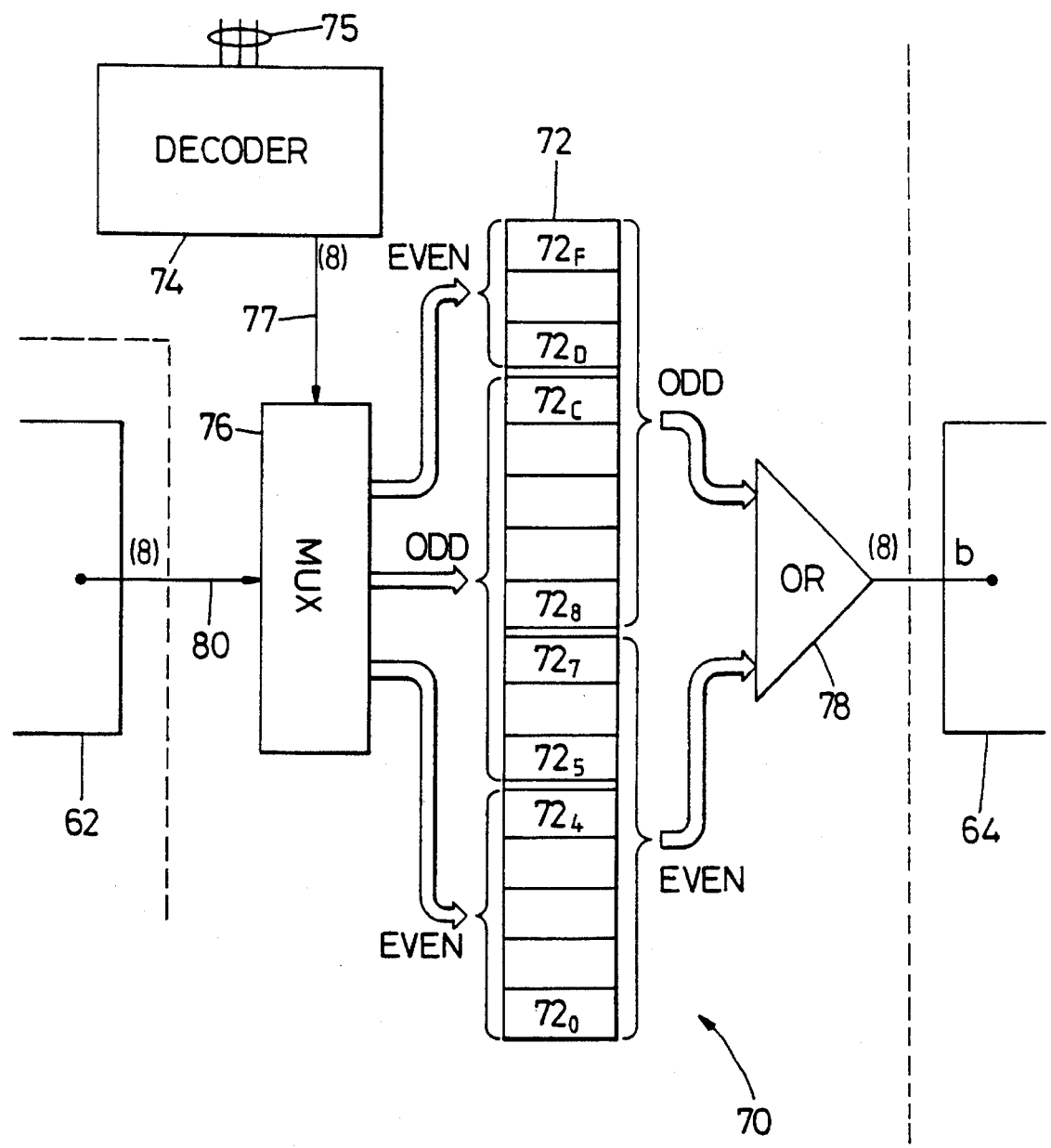
FIG. 3 shows a detailed schematic diagram of the operand align unit according to FIG. 1.

With reference now to FIG. 3, there is shown a virtual bit shifter 70 which is a bit rotator. It includes a 16-bit latch 72 having bit positions $72_0$ to $72_F$, a decoder 74 for receiving the three-bit bit align control signal (bACS) on line 75. The bACS comprises the three least significant bits 46 of the exponent difference register 48, taking the value j=0..7, and is converted to a positive number where the running total is greater than the new additive. The virtual bit shifter 70 also includes routing logic in the form of multiplexer 76 and multiple input OR gate 78.

The outputs 77 of decoder 74 control the displaced latching of the virtual bit shifter inputs 80 from input switch 62. Eight output lines 77 cause, when active, a displacement of input 80 by j bits in the downward direction into latch 72. This will cause the (8-j) least significant bits of the input mantissa to be presented on operand switch terminal b. This will be aligned with the j most significant bits of the non-aligned mantissa (of the larger exponent number) on terminal a or c of operand switch 64.

The operation works in a cyclic push-pull fashion. Before each mantissa is received, the latch is reset. Then, by way of example, suppose that:

(i) at odd numbered clock cycles, the input from switch 62 is latched in positions $72_{(8-j)}$ through $72_{(15-j)}$ while the old contents of latch positions $72_8$ through $72_F$ are output to the byte adder 90 on operand switch 64 terminal b;

(ii) at even numbered clock cycles, the input is latched in positions $72_{(16-j)}$ through $72_{(7-j)}$ while the old contents of latch positions $72_0$ through $72_7$ are output to the byte adder 90 on operand switch terminal b.

The specific example shown in FIG. 3 shows a bit align control signal bACS representing j=3. Thus, on line 75, bits "011" are transmitted. Decoder 74 produces corresponding output on lines 77 causing latch 72 to latch odd-numbered-clock-cycle bytes into latch positions $72_5$ through $72_C$, and even-numbered-clock-cycle bytes to be latched into latch positions $72_D$ through $72_4$.

The delay is thus two clock cycles, and the latch acts as a shift register. Alternatively, the delay could be reduced to a single clock cycle with simplified latching if the output to the byte adder 90 were arranged such that the j-least significant bits of the aligned mantissa were passed directly to the j-most significant positions of the byte adder 90, while the (8-j)—most significant bits were latched and output at the next clock to the (8-j)-least significant positions of the byte adder 90. This would be at the expense of a more complex demultiplexer in place of OR gate 78, to which the inputs to, as well as the outputs from, latch 72 would be provided. Then, counted from $72_F$ to $72_0$, an input i would be passed to a demultiplexer 78 directly if i<j. Otherwise, the corresponding output from the latch 72 would be taken.

Register file

Of the estimated gate count of an ASIC summation unit, the majority is attributed to the register file. This includes, in the preferred embodiment, sixteen running total register $131_0$ through $131_F$ (for storing running totals $RT_0$ through $RT_F$), each of eight bytes with separate register addressing (0..F) and byte-addressing (0..7). Bytes within a register are grouped into odd and even for purposes previously described herein.

The register file also includes address registers (not shown). A 4-bit register records current running total address (16 possibles), and two 2-bit registers are used to provide byte addressing within a running total: ie. one for even numbered clock cycles and one for odd numbered clock cycles.

The running total address is incremented for each new additive, and initialised by control block 40 using the start summation signal SS provided from i/o control block 14. The byte address is incremented with each successive byte, but may also be conditioned with an offset by byte align control signal BACS from control block 40 where the exponent difference register 48 records an exponent difference greater than 7 bits.

Output mode

The final mode of operation of the summation unit is the output of the up to sixteen running totals from register file 130.

Running totals $RT_0$ through $RT_F$ are accessed from register file 130 in sequence by assertion of appropriate register address RA from control block 40. Byte selection is via BACS line. Each running total is placed, byte-by-byte on line 132 to be passed to byte adder 90, by way of operand switch 64 with O2=c selected. No new additive (operand O1) is presented. The byte adder performs a two's complement conversion on O2 where necessary, and passes it to result register 110 for output onto the output bus 116.

While the present invention has been described in the context of additives being provided from the output buffer of a relational database co-processor such as that described in the cross-referenced document, it will be understood that the data source may be from any appropriate device. It will also be recognized that the handling of numeric additives in bytes is a practical embodiment utilising the 8-bit output bus: any number of bits may be conveniently handled in parallel by the operand align unit and byte adder to form a single numeric additive—for example a 16-bit bus may be envisaged.

Other variations for the structure of the summation unit and method of the invention are conceivable and are deemed to be covered under the scope of the present invention which is as defined in the appended claims.

I claim:

1. A summation unit (20) for the cumulative summation of a series of numeric additives, each represented by a plurality of bit-sequences and having a format, the summation unit comprising:

storage means (130) for storing at least one cumulative summation running total (RTn) of the series of numeric additives, each stored cumulative summation running total having an associated address;

selection means (40) for selecting from the plurality of bit sequences in a predetermined order according to the format a first bit sequence and for selecting from the cumulative summation running total RTn according to the format and associated address a second bit-sequence corresponding to the first bit-sequence;

receiving means (60) for receiving the first bit-sequence to form a first operand (O1) and the second bit-sequence to form a second operand (O2);

addition means (90) for adding the first and second operands to provide a result as a third bit-sequence; and write means (110) for updating the cumulative summation running total RTn of storage means (130) with the third bit-sequence.

2. A summation unit according to claim 1 further including:

exponent difference determining means to determine an exponent difference between a numeric additive and the running total; and first alignment means (70) within the receiving means for pre-aligning the bit-sequence of one of the operands (O1,O2) relative to the other operand in accordance with the determined exponent difference.

3. A summation unit according to claim 2 further including:

second alignment means (BS, BACS) for modifying the identity of the bit-sequence of the running total or the new additive to be selected by said selection means as a result of the exponent difference.

4. A method of cumulative summation of a series of numeric additives, each additive having a format and comprising a plurality of bit-sequences which make up said additive, said bit-sequences being presented in series, said method comprising the steps of:

storing at least one cumulative summation running total (RTn) of the series of numeric additives;

selecting from the plurality of bit-sequences in a predetermined order according to the format a first bit-sequence and selecting from the cumulative summation running total RTn according to the format a second bit-sequence corresponding to the first bit-sequence;

receiving the first bit-sequence to form a first operand (O1) and the second bit-sequence to form a second operand (O1);

adding the first and second operands to provide a result as a third bit-sequence; and updating the storage means (130) with the third bit-sequence.

5. A method of summation of two floating point format additives including the steps of:

a) comparing exponent portions of each additive to identify a byte-shift value (46) and a bit-shift value (47);

b) selecting a first mantissa byte from the first additive as a first operand (O1);

c) selecting a corresponding byte from the second additive, the corresponding byte being selected according to the byte-shift value;

d) bit-shifting the corresponding byte according to the bit-shift value to form a second operand (O2);

e) performing an addition or subtraction operation on the first and second operands (O1, O2); and f) repeating steps b) to e) for successive mantissa bytes of each additive.

6. A method according to claim 5 wherein the bit-shifting operation includes the steps of:

loading the corresponding byte into latch positions (92n) determined by the bit-shift value (47);

asserting at the latch output selected bits required to form said second operand (O2) and retaining in the latch non-selected bits not required to form said second operand; and retaining said non-selected bits in the latch to be used to form a part of a successive operand.

7. A method according to claim 5 or claim 6 wherein one of said first or said second additive mantissa bytes is retrieved from a cumulative total store (130); and said addition or subtraction operation further includes the step of storing a result byte of the sum of the two operands (O1,O2) in an intermediate buffer (110) for a predetermined period before writing the result to the cumulative total store, said predetermined period being of sufficient duration to allow the retrieval of a successive byte from the cumulative total store before said writing of the result.

* * * * *